W. Adel,
Eaves Trough.
No. 98,328.  Patented Dec. 28, 1869.
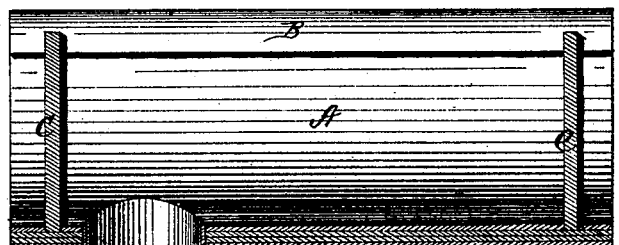
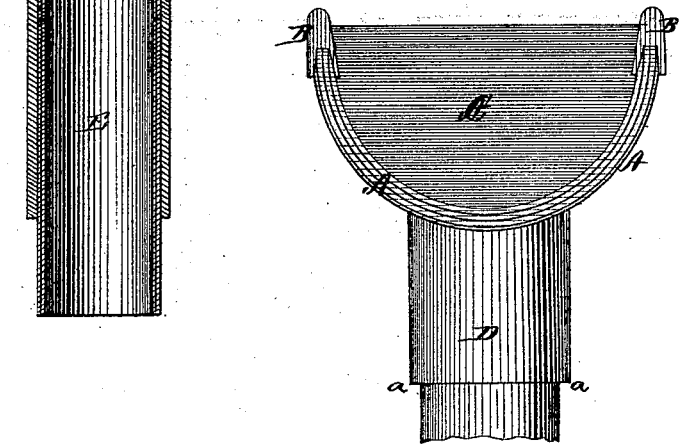
Witnesses  
F. Schmann  
C. L. Burt
Inventor.  
William Adel  
per Alexander Mason  
Atty.

United States Patent Office.

WILLIAM ADEL, OF ROCKTON, ILLINOIS.

Letters Patent No. 98,328, dated December 28, 1869.

IMPROVED EAVES-TROUGH.

The Schedule referred to in these Letters Patent and making part of the same.

*To all whom it may concern:*

Be it known that I, WILLIAM ADEL, of Rockton, in the county of Winnebago, and in the State of Illinois, have invented certain new and useful Improvements in Eaves-Troughs; and do hereby declare that the following is a full, clear, and exact description thereof, reference being had to the accompanying drawings, and to the letters of reference marked thereon, making a part of this specification.

The nature of my invention consists in the construction of paper eaves-troughs and spouting, as will be hereinafter fully set forth.

In order to enable others skilled in the art to which my invention appertains, to make and use the same, I will now proceed to describe its construction and operation, referring to the annexed drawings, in which—

Figure 1 is a longitudinal vertical section, and
Figure 2 is an end view.

A represents an eaves-trough made of paper saturated with some kind of composition, so as to render it impervious to water, and bent in proper shape.

The edges of the trough are inserted into grooved bars B B, and secured therein by screws or other suitable means.

Within the trough, at any desired point, is placed a semicircular wooden partition, C, to hold the trough in the shape desired, said blocks or partitions being secured by the screws passing through the grooved bars B B. The partitions C C may be made of any shape or size desired, so as to cause the trough to retain the form given to the same.

At any desired point in the bottom of the trough A is an opening, from which a pipe, D, leads downward. This pipe is also made of paper saturated with composition, and is connected with the trough in any suitable manner.

The lower end of the pipe D is made thinner than the rest of the pipe by being cut off on the outside, forming a shoulder, *a*, around the pipe.

This lower thin portion of the pipe D is inserted into the upper end of the pipe E, which is cut out on the inside so as to correspond with the pipe D, in such a manner that when the two pipes are joined both their inner and outer surfaces shall be even.

The lower end of the pipe E is made in the same manner as the lower end of the pipe D, and by this means the spouting can be extended to any height.

Having thus fully described my invention,

What I claim as new, and desire to secure by Letters Patent, is—

1. The trough A, grooved bars B B, and partitions C C, all constructed substantially as described, and for the purposes set forth.

2. In combination with trough A, bars B B, and partitions C C, the pipes D and E, constructed substantially as described, and for the purposes set forth.

In testimony that I claim the foregoing, I have hereunto set my hand, this 13th day of September, 1869.

WILLIAM ADEL.

Witnesses:
 CALEB BENTLEY,
 GEORGE B. WATSON,
 C. B. MARTIN.